Oct. 23, 1934.  C. J. PETTIBONE  1,978,142
SAWING RIG
Original Filed Oct. 31, 1932   2 Sheets-Sheet 2
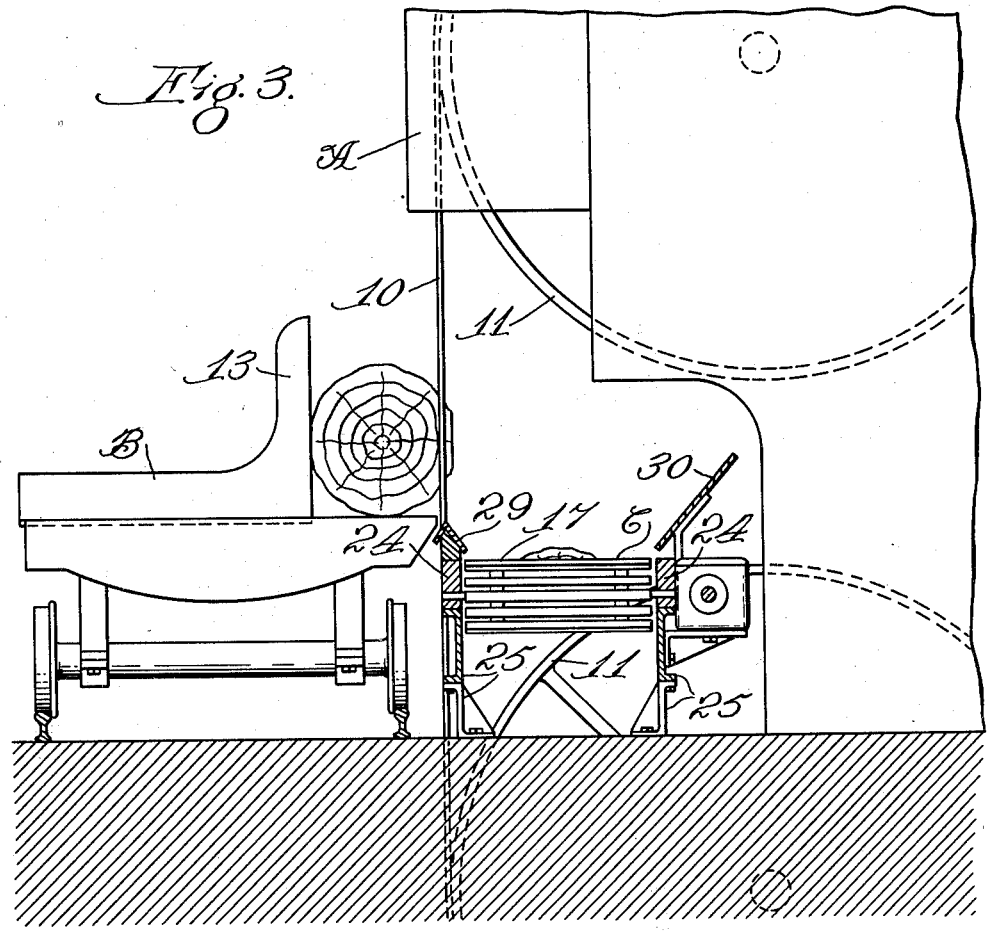
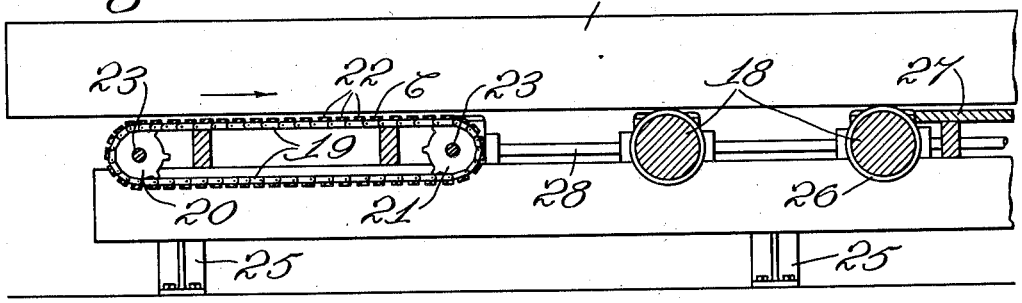
Inventor:
Charles J. Pettibone.
By Dyrenforth Lee Chritton & Wiles
Attys.

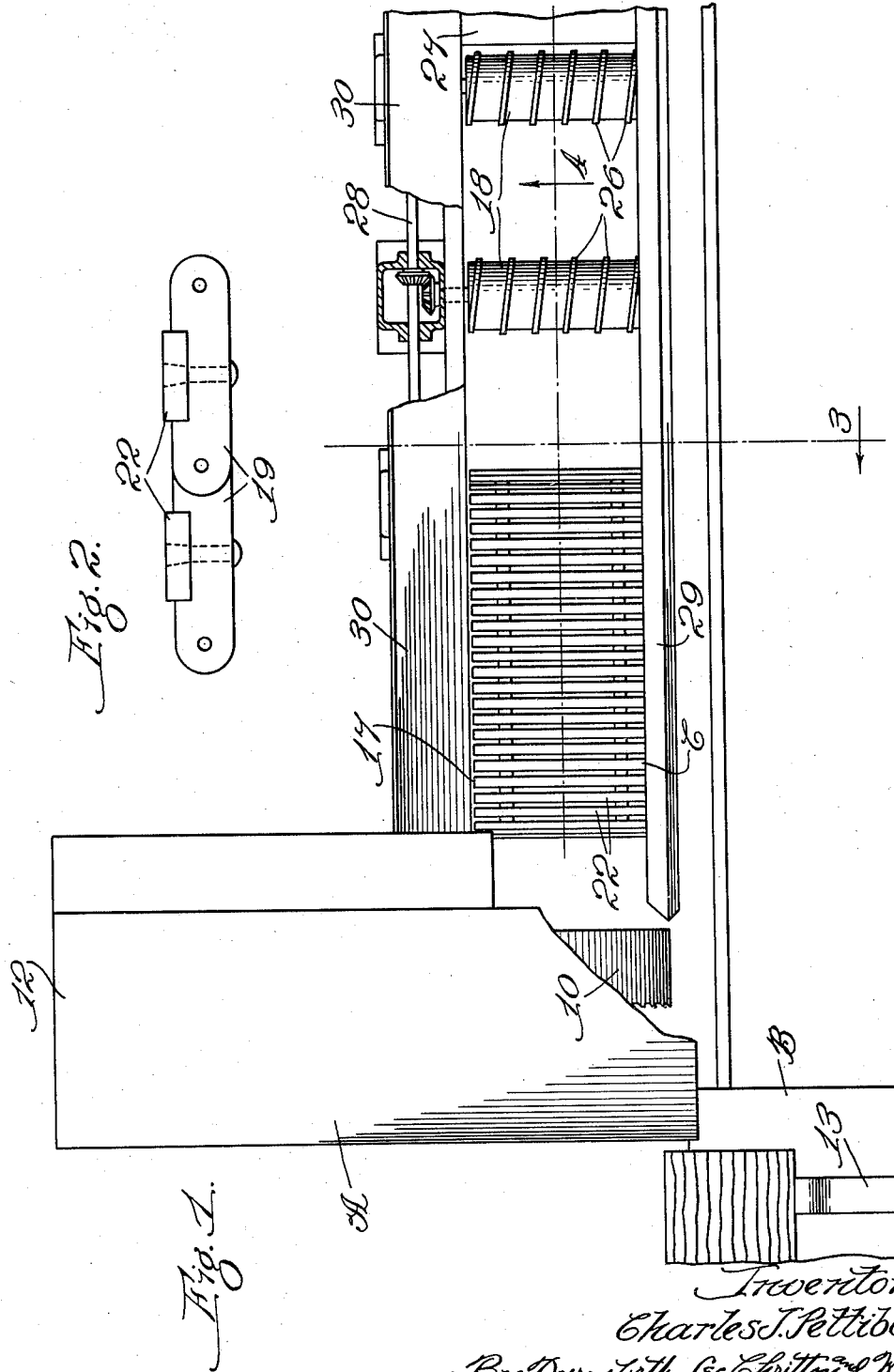

Patented Oct. 23, 1934

1,978,142

UNITED STATES PATENT OFFICE 1,978,142

SAWING RIG

Charles J. Pettibone, Hines, Oreg., assignor to Edward Hines Western Pine Co., Hines, Oreg., a corporation of Delaware Original application October 31, 1932, Serial No. 640,533. Divided and this application March 6, 1933, Serial No. 659,887

4 Claims. (Cl. 143—25)

This invention relates to a sawing rig and more particularly to a conveyor apparatus associated therewith. This application constitutes a division of my co-pending application, Serial No. 640,553, Patent No. 1,909,314, issued May 16, 1933, for Sawing rig.

An object of the invention is to provide improved means for mechanically handling the boards, as well as the sawdust and wood fragments, delivered from the saw, in such a manner as to separate the fragments from the boards and to align the boards at a safe distance from the saw and the log carriage. A further object is to provide mechanical means for swiftly and accurately removing boards and wood fragments from the vicinity of the saw and log carriage and in such manner as to prevent injury to the workmen and damage to the boards. Other specific objects and advantages will appear as the specification proceeds.

The invention is illustrated, in its preferred embodiment, by the accompanying drawings, in which—

Figure 1 is a broken plan view of apparatus embodying my invention; Fig. 2, a side detail view of part of the slat conveyor apparatus employed; Fig. 3, a vertical part-sectional view, the section being taken as indicated at line 3 of Fig. 1; and Fig. 4, a longitudinal part-sectional view, the section being taken as indicated at line 4 of Fig. 1.

In the illustration given, A represents sawing apparatus; B, the carriage or log-feeding mechanism; and C, conveyor apparatus.

The saw apparatus A may be of any suitable construction. In the illustration given, a band saw 10 is mounted upon wheels 11, the wheels being journaled within a suitable frame or casing 12. These parts are all of well known construction.

The carriage or timber-feeding mechanism B may also be of any suitable construction. In the illustration given, a carriage of well known construction is illustrated and a detailed description is believed to be unnecessary.

My improved conveyor mechanism C will now be described. As shown more clearly in Figs. 2 and 4, the conveyor apparatus consists of a continuous slat-bed conveyor 17 and screw rollers 18. The conveyor 17 consists of link chains 19 mounted on sprocket wheels 20 and 21 and of slats 22 which are secured to the links 19. The sprocket wheels 20 are mounted upon shafts 23 which are journaled in longitudinal beams 24. The beams 24 are supported upon the metal beams 25 or upon any other suitable supports. Similarly supported upon the beams 24 are a plurality of screw rollers 18. Each of the rollers is provided with spiral threads 26. As shown more clearly in Figs. 1 and 4, a space is provided between the first two rollers 18 and the conveyor 17. Beyond the second roller, a platform 27 extends between each of the succeeding screw rollers (not shown). With this construction, the small particles carried upon the conveyor 17 will drop between the conveyor and the first roller and between the first two rollers; and, if desired, a conveyor (not shown) may be provided therebelow for carrying away such wood fragments.

Any suitable means for driving the conveyor 17 and the screw rollers 18 may be employed. In the illustration given, the rollers 18 and the sprocket wheel 21 are driven by bevel gear connections with a drive shaft 28, as illustrated more clearly in Fig. 1. Preferably, the gear ratios are such as to drive the slat conveyor 17 at a relatively slower speed, say about 300 lineal feet per minute, and the screw rolls at a relatively faster speed, say about 400 lineal feet per minute.

In order to take the boards as they are severed from the log and to guide them into the proper position upon the conveyor C, I provide a shear or inclined guide 29 which is supported upon the beam 24 substantially between the saw 10 and the conveyor C, as shown more clearly in Fig. 3. On the opposite side of the conveyor, I provide an inclined shield 30 which is supported above the beam 24.

Operation

In the operation of the apparatus, the band saw is driven by the wheels 11 in a well known manner, and the carriage B is moved back and forth to feed the log or other form of timber to the saw. As the boards fall from the saw, they are guided by the shear 29 into a natural flat position upon the slat conveyor 17 and rollers 18 so that they are not damaged in any way. As the slat conveyor 17 is driven at a lower speed than the rollers 18, the slat conveyor tends to hold back the ends of the board while the screws on the rollers push the board over to one side away from the carriage. The board is then carried forward by the rolls at a safe distance from the carriage. The slatted-bed conveyor carries away all short pieces and sawdust and dumps them into the space between the bed conveyor and the first roller. Any suitable means may be employed for disposing of such material as, for example, a conveyor to carry the fragments to a machine where they may be ground into fuel for the boiler room. The shield or guard 30 serves to keep the bark, sawdust, and other fragments from being thrown on to the floor and also serves to keep short slabs or boards from traveling crosswise on the rollers. The conveyor mechanism, in addition to carrying away all the wood fragments, prevents injury to the sawyer and other workmen by enabling the carriage to be reciprocated without striking boards or slabs traveling on the conveyor. The mechanism serves the purpose of pushing the ends of the boards over and aligning them upon the conveyor as a whole, thus giving the boards a straight start along the conveyor.

While, in the illustration given, I have set forth specific and detailed construction, it will be understood that wide changes in construction may be made without departing from the spirit of my invention. The foregoing detailed description has been given for clearness of understanding only, and no unnecessary limitations should be understood therefrom, but the appended claims should be construed as broadly as permissible, in view of the prior art.

I claim:

1. In combination with a driven saw and means for feeding timber thereto, an endless conveyor providing a bed for boards and fragments falling from said saw, screw rolls aligned with said conveyor and equipped with spiral threads adapted to direct boards away from the saw, an inclined guide adapted to direct boards and fragments from the saw upon said conveyor, said guide being substantially in the form of an inverted V, and said timber-feeding means including a carriage having an inner inclined wall adjacent said guide and substantially parallel with the adjacent inclined wall of the guide, and means for driving said rolls and said conveyor.

2. In combination, a pair of vertical aligned wheels mounted for rotation, a continuous band-saw carried thereby in a vertical plane, an inverted U-shaped guide supported adjacent said band-saw with the V-point of the guide aligned with the band, a conveyor supported on one side of said guide, and a timber-feeding carriage mounted for longitudinal movement along the other side of said guide, said carriage having its wall adjacent the guide provided with a panel parallel with the inclination of the adjacent guide wall and overlapping the same in a vertical plane.

3. In combination with a driven saw, an endless slat conveyor affording a platform to receive boards and wood fragments from said saw, screw rolls alined with said conveyor and having their threads turned away from said saw, a timber-feed carriage mounted for longitudinal movement along the side of said conveyor but on the other side of said saw, said carriage being provided with an inclined inner wall, a guide having an inclined wall adapted to direct boards and fragments from the saw upon said conveyor and having also an inclined wall adjacent to, and parallel with, the inclined wall of said carriage, and means for driving said conveyor and said rolls.

4. In combination with a driven saw and timber-feeding means therefor, said timber-feeding means comprising a carriage mounted for longitudinal movement adjacent and at right angles to said saw, said carriage having an inclined wall on its side adjacent said saw, an endless conveyor affording a platform to receive boards and wood fragments from said saw, screw rolls alined with said conveyor, an inclined guide adapted to direct boards and fragments from the saw upon said conveyor, said guide having a flange substantially parallel with the inclined wall of said carriage, and means for driving said rolls and said conveyor.

CHARLES J. PETTIBONE.